United States Patent
Reddy et al.

(10) Patent No.: US 6,981,552 B2
(45) Date of Patent: *Jan. 3, 2006

(54) WELL TREATMENT FLUID AND METHODS WITH OXIDIZED POLYSACCHARIDE-BASED POLYMERS

(75) Inventors: B. Raghava Reddy, Duncan, OK (US); Larry S. Eoff, Duncan, OK (US); Eldon Dwyann Dalrymple, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 246 days.

This patent is subject to a terminal disclaimer.

(21) Appl. No.: 10/394,461

(22) Filed: Mar. 21, 2003

(65) Prior Publication Data

US 2004/0182575 A1   Sep. 23, 2004

(51) Int. Cl.
*E21B 43/00* (2006.01)

(52) U.S. Cl. ................................ 166/294; 166/300

(58) Field of Classification Search ................. 166/294, 166/300

See application file for complete search history.

(56) References Cited

U.S. PATENT DOCUMENTS

| | | | |
|---|---|---|---|
| 4,082,743 A | 4/1978 | Hearon et al. | |
| 4,663,448 A | 5/1987 | Chiu | |
| 5,322,123 A | 6/1994 | Kohler et al. | |
| 5,563,186 A | 10/1996 | Thompson | |
| 5,747,658 A | 5/1998 | Veelaert et al. | |
| 5,836,392 A | 11/1998 | Urlwin-Smith | 166/295 |
| 6,119,701 A | 9/2000 | Cerami et al. | |
| 6,258,755 B1 | 7/2001 | House et al. | 507/110 |
| 6,267,893 B1 | 7/2001 | Luxemburg | 210/723 |
| 6,291,404 B2 * | 9/2001 | House | 507/110 |
| 6,294,604 B1 | 9/2001 | House | 507/110 |
| 6,303,585 B1 | 10/2001 | Spiro et al. | |
| 6,358,889 B2 * | 3/2002 | Waggenspack et al. | 507/110 |
| 6,764,981 B1 * | 7/2004 | Eoff et al. | 507/110 |

* cited by examiner

*Primary Examiner*—John Kreck
(74) *Attorney, Agent, or Firm*—Robert A. Kent

(57) ABSTRACT

The present invention provides a well treatment fluid containing water, a amine-based polymer, and an oxidized polysaccharide-based polymer. The oxidized polysaccharide-based polymer is able to crosslink with the amine-based polymer and produce a gel having a viscosity of greater than about 20 cp, measured at a pH of about 4 to about 7 and at STP. The present invention also provides a method of treating a subterranean formation penetrated by a wellbore comprising the steps of: (a) forming the well treatment fluid, and (b) contacting the subterranean formation with the fluid.

19 Claims, No Drawings

WELL TREATMENT FLUID AND METHODS WITH OXIDIZED POLYSACCHARIDE-BASED POLYMERS

FIELD OF THE INVENTION

The invention relates to aqueous well fluids containing amine containing or amine-based polymers and oxidized polysaccharide-based polymers and to methods of drilling and servicing wells using such fluids.

BACKGROUND OF THE INVENTION

As hydrocarbon-producing wells mature, water production becomes a serious problem. Remediation techniques for controlling water production are generally referred to as conformance control. Remediation techniques are selected on the basis of the water source and the method of entry into the wellbore. Conformance control treatments include sealant treatments and relative permeability modifiers (also referred to as disproportionate permeability modifiers).

In previous years, water-soluble chromium (+3) crosslinked polyacrylamide gels have been used in conformance control treatments. The gel time was usually controlled by the addition of materials that chelate with chromium in competition with the polymer-bound carboxylate groups. The crosslinking reactions in these gel systems take place by the complexation of Cr (+3) ions with carboxylate groups on the polymer chains. Because of the nature of the chemical bond between Cr (+3) and the pendant carboxylate groups, formation of insoluble chromium species can occur at high pH values. Other problems with these systems include thermal instability, unpredictable gel time, and gel instability in the presence of chemical species that are potential ligands.

Another water-based gel system for conformance control is based on phenol/formaldehyde crosslinker system for homo-, co-, and ter-polymer systems containing acrylamide. The crosslinking mechanism involves hydroxymethylation of the amide nitrogen, with the subsequent propagation of crosslinking by multiple alkylation on the phenolic ring. Because of the nature of this chemical bond, the gel time is controllable over a wide temperature range. Although these gels work well, phenol and formaldehyde are highly toxic.

U.S. Pat. No. 5,836,392 discloses a system based on a polyethyleneimine (PEI) crosslinker and a copolymer of acrylamide and t-butyl acrylate (PA-t-BA). PEI is such a low-toxicity material that the Food and Drug Administration has approved it in the United States for food contact. Although non-toxic, PEI can bioaccumulate or persist in the environment for long periods.

It has been shown that chitosan can be used in place of polyethyleneimine to crosslink acrylamide based polymers. Chitosan's usefulness as a crosslinker has been limited, however, by its relative poor solubility in aqueous solutions. For example, commercial sources of chitosan are only sparingly soluble in water; about 1–2% active solutions are the highest concentrations that can be made while maintaining usable viscosity. While this is a step forward in the effort to provide more environmentally acceptable systems, the major component, or base polymer, of such a gel system is still a non-biodegradable polymer. The major component of such gel system is generally a homopolymer or copolymer of acrylate-type monomers, such as acrylic acid, acrylamide, vinylpyrrolidone etc. The backbone of such polymers contains continuous carbon-carbon single bonds, which are of poor biodegradability. Since the chitosan crosslinker is only a minor component of the gel composition, the total system is still predominantly non-biodegradable due to poor biodegradability of the synthetic base polymer.

SUMMARY OF THE INVENTION

The present invention provides a well treatment fluid containing water, an amine-based polymer, and an oxidized polysaccharide-based polymer. The oxidized polysaccharide-based polymer is able to crosslink with the amine-based polymer and produce a gel having a viscosity of greater than about 20 cp. The present invention also provides a method of treating a subterranean formation penetrated by a wellbore comprising the steps of: (a) forming the well treatment fluid, and (b) contacting the subterranean formation with the fluid.

These and other embodiments of the present invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims. The compositions can comprise, consist essentially of, or consist of the stated materials. The method can comprise, consist essentially of, or consist of the stated steps with the stated materials.

DETAILED DESCRIPTION

In general, the present invention provides a well treatment fluid containing water, an amine-based polymer, and an oxidized polysaccharide-based polymer. The oxidized polysaccharide-based polymer is able to crosslink with the amine-based polymer and produce a gel having a viscosity of greater than about 20 cp. The viscosity of the gel is preferably measured at a pH of about 4 to about 7 and at STP. The well treatment fluid of the present invention is useful as a well drilling and servicing fluid in various operations such as drilling, fracturing, sand control, lost circulation control, completion, conformance control, work over, and the like.

The present invention relates to aqueous conformance control fluids and treatments. The water used for the well treatment fluid can be of any convenient source, including fresh water, seawater, natural brine, formulated brine, 2% KCl solution, and any mixtures in any proportion thereof. Formulated brine is manufactured by dissolving one or more soluble salts in water, natural brine or seawater. Representative soluble salts are the chloride, bromide, acetate and formate salts of potassium, sodium, calcium, magnesium and zinc. The preferred water for the well treatment fluid is 2% KCl solution or seawater.

The amine-based polymers preferably have pendant amino groups on the polymer which can react with the carbonyl group of the oxidized polysaccharides. The pendant amino group may be a primary or secondary amine. Examples of amine-based polymers which are useful in the present invention include, but are not limited to, polyvinylamine, polyvinylalcoholamine, chitosan, polylysine and the like. Preferred amine-based polymers include chitosan, polyvinylalcoholamine and polylysine. Occasionally, a pendant amine may be a part of a branched structure of a polymer. Examples of such polymers which are useful in the present invention include polyethyleneimine. Poly(vinylalcohol vinylamine) polymers, also referred to as vinylalcohol/vinylamine copolymers are available, for example, from ERKOL Corp. of Tarragona Spain. The mole % vinylamine present in the polymer may range from about 1 to about 12% and the molecular weight of the polymer may be in the range of from about 10,000 to about 150,000. Although chitosan has been used in aqueous conformance control, its usefulness has been severely limited by its relative poor solubility in water. Chitosan is a beta-(1→4)-polysaccharide of D-glucosamine, and is structurally similar to cellulose, except that the C-2 hydroxyl group in cellulose is substituted with a primary amine group in chitosan. Chitosan occurs in nature in small amounts and is biodegradable. Chitosan degrading enzymes, namely chitonases, chiosanases, and lysozymes that degrade chitin-derived materials occur in bacteria, fungi, algae, mammals, birds, fish, etc. The biodegradability of chitosan is comparable to hydroxyethylcellulose (HEC). In-house Biochemical-Oxygen-Demand (BOD) and Chemical-Oxygen-Demand (COD) tests show a BOC/COD of 54% compared to 32% for HEC (according to HACH Method 8000 that is described in the HACH Water Analysis Handbook, 3rd ed., Hach Company (1997)).

Chitosan is a partially or fully deacetylated form of chitin. Chitin is a naturally occurring polysaccharide, which is the second most abundant natural product on earth preceded only by cellulose. Structurally, chitin is a polysaccharide consisting of beta-(1→)2-acetamido-2-deoxy-D-glucose units, some of which are deacetylated. Chitin is not one polymer with a fixed stoichiometry, but a class of polymers of N-acetylglucosamine with different crystal structures and degrees of deacetylation and with fairly large variability from species to species. Typically, chitosan has a degree of deacetylation that is between 50% and 100%. The degree of deacetylation in the commercially available chitosan is usually in the 70% to 78% range.

The large number of free amine groups (pKa=6.3) makes chitosan a polymeric weak base. However, because chitosan is a polysaccharide containing many primary amine groups, it forms water-soluble salts with many organic and inorganic acids. For example, chitosan is somewhat more soluble in dilute aqueous acids, usually carboxylic acids, as the chitosonium salt. Nevertheless, the solubility of chitosan in acidified water, for example in acetic or hydrochloric acid, is still only in the 1 to 2% range. If the pH of the solution is increased above 6.0, polymer precipitation occurs, thus limiting its solubility. The viscosity of the aqueous chitosan solution depends on the molecular weight of the polymer.

In an advantageous embodiment, the present invention employs an oxidized chitosan-based polymer to overcome the relative poor solubility of chitosan. Thus, the oxidized chitosan-based polymer can serve both as a crosslinker and base polymer to the oxidized polysaccharide-based polymer. Some examples of chitosan-based polymers suitable for oxidation in the present invention include chitosan, chitosan salts with mineral and organic acids, and any combination in any proportion thereof. Some commercial examples of chitosan include Chitosan Lactate available from Vanson HaloSource and Hydagen HCMF available from Cognis.

To oxidize the chitosan-based polymer, a wide variety of oxidizers can be used. Examples of oxidizers include sodium hypochlorite, sodium periodate, hydrogen peroxide, peracetic acid, and any mixture in any proportion thereof. The selection of the oxidizer and the concentration of oxidizer should be sufficient to oxidize or degrade the chitosan-based polymer to a desired solubility. Oxidizing the chitosan-based polymer increases its solubility. Without being limited by the theoretical explanation, the oxidation of the chitosan-based polymer divides the polymer into shorter chain segments, thus increasing its solubility. Increased solubility of the chitosan-based polymer may also be explained by the introduction of carboxyl groups. By increasing solubility of the chitosan-based polymer, it can be used in higher concentration in fluids, thereby utilizing it as the base polymer in the fluids, rather than merely as a crosslinker.

In the present invention, the oxidized polysaccharide-based polymer is able to crosslink with the chitosan-based polymer in water and produce a gel having a viscosity of greater than or equal to about 20 cp. The viscosity is preferably measured at a pH of about 4 to about 7 and at STP. Gels ranging from stiff and ringing type to "lipping" gels can be obtained.

Without being limited by any theoretical explanation, it is believed that oxidation of the polysaccharide-based polymer introduces carbonyl groups. Thus, the oxidized polysaccharide-based polymer can include a number of carbonyl-based functional groups such as aldehydes, anhydrides, carboxyl groups, ketones and esters. The amine-based polymer includes an amino nucleophile bearing an electron pair, thus enabling it to react or crosslink with the carbonyl groups of the oxidized polysaccharide-based polymer. The terms nucleophile and nucleophilic refer to a negative ion or neutral molecule, such as a primary or secondary amine group on the amine-based polymer, which brings an electron pair into a chemical reaction with another electron accepting reactive group or positive ion, called an electrophile. An electrophile, such as the oxidized polysaccharide-based polymer having or modified to have carbonyl groups is capable of accepting the electron pair, thereafter forming a covalent bond.

Some non-limiting examples of water-soluble or water-swellable oxidized polysaccharide-based polymers include dialdehyde starch (DAS), dialdehyde cellulose, oxidized starch, oxidized cellulose, oxidized agarose, oxidized partially-acetylated cellulose, and combinations thereof. It should be noted that DAS or polymeric dialdehyde is also referred to as oxidized starch. DAS is preferred as the oxidized polysaccharide-based polymer, which has as low as 12% oxidation. DAS can be obtained from any of a number of chemical suppliers, such as Sigma Chemical Company (Catalog N. P9265) or a manufacturer, Monomer-Polymer & Dajac Laboratories, Inc. Further examples of oxidized polysaccharide-based polymers include aldehyde agarose, oxidized gums such as guar, locust bean gum, gum Arabic, tragacanth, gutta percha or xanthan and alginate salts.

Oxidized polysaccharide-based polymers can also contain ketones, anhydrides and active esters. Ketones useful in the practice of the present invention can include alpha-dicarbonyl compounds, beta-dicarbonyl compounds, gamma-dicarbonyl compounds, and alpha, beta-unsaturated ketones.

DAS, or oxidized starch is the preferred polysaccharide-based polymer used to crosslink the chitosan-based polymer and form rigid gels at useful temperatures. Starch $(C_6H_{10}O_5)_n$, is a mixture of linear (amylose) and branched (amylopectin) polymers of α-D-glucopyranosyl units. It is a principal reserve polysaccharide in plants, and constitutes a substantial portion of the human diet; thus it is a biodegradable option for well treatment fluids. Starch suitable for oxidation as in the present invention can include a number of starch-based polymers. In one embodiment, the starch is selected from the group consisting of corn starch, potato starch, waxy maize, dextrinized starch and any mixtures in any proportion thereof. Additionally, the starches may be modified chemically prior to oxidation. Examples of such starches include cationic starches, hydroxyethylated starches, hydroxypropylated starches, carboxylated starches and the like.

The extent of oxidation of the polysaccharide-based polymer can be controlled by, for example, the amount of oxidizer added, the duration of the oxidation process and the temperature of reaction. For example, oxidation time for starch can be attained in 24 hours. Oxidized starch is prepared by oxidizing about 1% to about 25% of the glucose units of the starch. A variety of oxidizers can be used to oxidize the starch, including oxidizers selected from the group consisting of alkali, alkaline earth and transition metal salts of, for example, periodate, hypochlorite, perbromate, chlorite, chlorate, hydrogen peroxide, peracetic acid and combinations thereof. Without being limited by theoretical explanation, it is believed that oxidation of the hydroxyl groups of C-2, C-3 and C-6 carbons of the glucose units in the starch gives electrophilic functional groups such as aldehydes, ketones, or carboxylic acids, which react with nucleophiles such as chitosan-based polymers.

The concentration of the polysaccharide-based polymer and amine-based polymer in the fluids is selected to be sufficient to impart to the fluids the rheological characteristics desired. The weight ratio of oxidized amine-based polymer to oxidized starch is from about 50:1 to about 1:50. In one advantageous embodiment that uses oxidized starch as the polysaccharide-based polymer, the chitosan-based polymer includes an oxidized chitosan-based polymer that is present in the amount of up to about 10 wt % of the water. At such high concentration in the well treatment fluid, the oxidized chitosan-based polymer serves as the base polymer. The oxidized starch, in turn, serves as a crosslinker to the oxidized chitosan-based polymer. In one embodiment, the oxidized starch is present in the amount of up to about 10 wt % of the water. In such embodiments, the chitosan-based polymer serves as a crosslinker to the oxidized starch. In one aspect, the weight ratio of the oxidized starch to chitosan-based polymer is from about 20:1 to about 1:20. Thus, the oxidized chitosan-based polymer can serve both as a crosslinker and a base polymer to the oxidized polysaccharide-based polymer. The oxidized chitosan-based polymer/ oxidized polysaccharide-based polymer combination provides an environmentally acceptable system since both the crosslinker and the major component are natural, non-toxic polymers.

Since chitosan-based polymers are typically more expensive than starch, the economic aspects of bio-degradability can be improved by using oxidized starch as the base polymer and either a substantially biodegradable polyvinylalcoholamine or a biodegradable chitosan-based polymer as the crosslinker. It is understood by those skilled in the art that both the amine-based polymer and the oxidized polysaccharide-based polymer can serve as a crosslinker. The polymer in lower concentration serves as a crosslinker to the polymer in higher concentration. However in the case of chitosan, because the non-oxidized chitosan-based polymer is of low solubility, the chitosan-based polymer must be oxidized to serve as the base polymer, or polymer of higher concentration.

To further illustrate the present invention, and not by way of limitation, the following examples are provided.

EXAMPLE 1

Table 1 provides the results obtained with oxidized starch and chitosan. The gel times are controlled by the degree of oxidation and the base polymer to cross-linker ratio, as well as the pH and temperature.

TABLE 1

| Chitosan concentration in 1% acetic solution | % starch oxidation | Chitosan to oxidized starch ratio (wt %) | pH | Temperature (° F.) | Gel Time (Hr:min) |
| --- | --- | --- | --- | --- | --- |
| 1% | 19 | 2:1 | 5 | 175 | 1:30 |
| 1% | 12.5 | 2:1 | 5 | 175 | 8 |

EXAMPLE 2

To improve the relative overall biodegradability of the gel compositions, starch was oxidized to different degrees to introduce carbonyl groups, and the resulting products were reacted with chitosan and oxidized chitosan. Initial experiments were directed to using oxidized chitosan as the base polymer and the oxidized starch as the crosslinker. The compositions yielded gels and the results are presented in Table 3. The degree of starch oxidation also effected the gel time. For example, when the degree of starch oxidation is high (higher level of carbonyl formation), the gel time is shorter than when the degree of oxidation is low.

TABLE 2

| Starch/Oxidizer[1] Weight Ratio | % Chitosan/ % Starch | Temp. (° F.) | pH | Gel Time (HRS) |
| --- | --- | --- | --- | --- |
| 50/1 | 5/2 | 160 | 4.9 | 1 |
| 50/1 | 5/2.5 | 160 | 4.9 | 8 |
| 50/1 | 5/1.5 | 160 | 4.9 | None in 65 hrs |
| 36/1 | 5/2 | 160 | 4.9 | 4.8 |
| 36/1 | 5/1.5 | 160 | 4.9 | 23 |
| 36/1 | 5/1 | 160 | 4.9 | None in 63 hrs |
| 50/1 | 5/2.5 | 160 | 4.9 | 8 |
| 50/1 | 5/2 | 190 | 4.9 | 5 |
| 50/1 | 5/1.6 | 190 | 4.9 | 11 |
| 50/1 | 5/1.5 | 160 | 4.9 | None in 65 hrs |
| 50/1 | 5/1.5 | 190 | 4.9 | 22 |
| 50/1 | 5/1.3 | 190 | 4.9 | 24 |

[1]sodium periodate was used as the oxidizer.

EXAMPLE 3

The results of using oxidized starch as the base polymer and the oxidized and non-oxidized, chitosan-based polymers as crosslinkers are shown in Table 4. The results indicate that the ratio of the base polymer to crosslinker as well as the concentration of the two components may be used to optimise the gel time.

TABLE 3

Oxidized Starch as the Base Polymer and Oxidized/Nonoxidized Chitosan as the Crosslinker

| Sample | Crosslinker | % Starch/ % Chitosan | Temp. (F.) | Gel Time (Hrs) |
| --- | --- | --- | --- | --- |
| 1 | Nonoxidized Chitosan | 8/0.2 | 180 | None in 3 day |
| 2 | Nonoxidized Chitosan | 2/0.8 | 180 | <than 45 min |
| 3 | Oxidized Chitosan[1] | 7/2 | 180 | No gel in 4 days |
| 4 | Oxidized Chitosan | 4.9/4.9 | 180 | <30 minutes |
| 5 | Oxidized Chitosan | 5/2 | 180 | <30 minutes |

TABLE 3-continued

Oxidized Starch as the Base Polymer and Oxidized/Nonoxidized Chitosan as the Crosslinker

| Sample | Crosslinker | % Starch/ % Chitosan | Temp. (F.) | Gel Time (Hrs) |
|---|---|---|---|---|
| 6 | Oxidized Chitosan | 5/1 | 180 | No gel in 4 days |

[1]Chitosan was oxidized with hydrogen peroxide in a suspension at elevated temperature followed by acidification with acetic acid The degree of oxidation of the polysaccharide-based polymer can be used to control gel time. In the case where chitosan is used as the crosslinker or base polymer, the degree of oxidation of chitosan can also be used to control the gel time. Besides the degree of oxidation, a number of other variables can be used to control gel time, or impact the gelling of the oxidized or non-oxidized, chitosan-based polymer with the oxidized polysaccharide-based polymers, irrespective of which serves as the crosslinker. Such variables include type of polysaccharide-based polymer, crosslinker concentration, pH of the gel system, mix water, application temperature and chitosan modification.

In comparing the ability of the oxidized polysaccharide-based polymers to crosslink or react with the oxidized/non-oxidized, chitosan-based polymer, the order of ease of crosslinking reactivity may be effected by steric resistance to the approach of the amino group of the oxidized/non-oxidized chitosan.

Yet another variable that can be used to control gel time is the pH of the gel system. The crosslinking reaction proceeds with decreasing pH of the gel system. This observation is in accordance with expectations for amine-type crosslinkers, such as oxidized/non-oxidized, chitosan-based polymers. Without being limited by theory, it is believed that the lone pair of electrons on the amine nitrogen groups of the amine-based polymer is expected to be protonated in acidic media, thus making them unavailable to initiate a nucleophilic attack on the oxidized polysaccharide-based polymer. Therefore, varying the pH of the gel system can by used to control gel time.

Still another variable that can be used to control gel time is the mix water, which is believed to effect the crosslinking reaction. The crosslinking reaction can proceed significantly faster in fresh water compared to seawater. Similar results occur in the crosslinking reactions of the prior art, such as crosslinking reactions of (PA-t-BA) with (PEI).

Therefore, gel time can be controlled by variables that include the degree of oxidation of the polysaccharide-based polymer, the pH of the solution, and base polymer/crosslinker ratio and the corresponding solution concentrations.

In high temperature applications, it can be more advantageous to use the oxidized chitosan-based polymer as a crosslinker because non-oxidized, chitosan-based polymers have very short gel times at high temperatures. It is difficult to achieve practical gel times with non-oxidized, chitosan-based polymers at such temperatures. Surprisingly, the oxidation of the chitosan-based polymer made the gelling compositions essentially salt-insensitive. It should be noted that gel time with the oxidized chitosan-based polymer appears to be more strongly influenced by temperature than other polymer/crosslinker ratios, or the corresponding concentrations especially at temperatures higher than 200° F., which may be indicative of the sterically hindered environment of the amino group in the oxidized chitosan-based polymer. The base polymers have different reactivities with crosslinkers, which allow the selection of suitable water-soluble polymer for a wide range of formation temperatures in conformance applications. The chitosan-based polymer/polysaccharide gel system has thermal stability in the temperature range applicable to many conformance-related applications, making it commercially useful.

The well treatment fluid of this invention generally will contain materials to provide various characteristics of properties to the fluid. Thus, the well treatment fluid can contain one or more viscosifiers or suspending agents in addition to the chitosan-based polymer, weighting agents, corrosion inhibitors, soluble salts, biocides, fungicides, seepage loss control additives, bridging agents, deflocculants, lubricity additives, shale control additives, pH control additives, and other additives as desired. The well treatment fluid can also contain one or more materials that function as encapsulating or fluid loss control additives to restrict the entry of liquid from the fluid to the contacted shale. Representative materials include partially solubilized starch, gelatinized starch, starch derivatives, cellulose derivatives, humic acid salts (lignite salts), lignosulfonates, gums, biopolymers, synthetic water soluble polymers, and mixtures thereof. If desired, watersoluble potassium salts can be incorporated into the fluids of this invention to increase the potassium ion content thereof. Other materials that may be added to fluids to enhance the shale stabilizing characteristics of the fluids are potassium chloride, potassium formate, and potassium acetate.

Mixtures of oxidized polysaccharide-based polymers and amine-based polymers can be prepared for addition to the well treatment fluid of this invention for maintenance of the properties thereof, or indeed, for preparing the initially prepared oil and gas well drilling and servicing fluids before adding the fluids of the present invention thereof. By oxidizing the polysaccharide-based polymer and crosslinking such polymer with a chitosan-based polymer, a treatment fluid made entirely of biodegradable material can be achieved. Furthermore, by oxidizing the chitosan-based polymer, the solubility of the chitosan-based polymer is increased so as to enable the chitosan-based polymer to be used in higher concentration in the treatment fluid, while still retaining the reactivity of the chitosan-based polymer.

An improved method of this invention for treating a subterranean formation penetrated by a wellbore is comprised of the following steps: (a) forming a well treatment fluid comprising water, the amine-based polymer, and a oxidized polysaccharide-based polymer; and (b) contacting the subterranean formation with the well treatment fluid. The oxidized polysaccharide-based polymer is able to crosslink with the amine-based polymer in water and produce a gel having a viscosity of greater than or equal to about 20 cp. In one embodiment, forming the well treatment fluid further includes the step of crosslinking the chitosan-based polymer with the polysaccharide-based polymer. Preferably, the viscosity of the gel of greater than or equal to about 20 cp is measured at a pH of about 4 to about 7 and at STP. In one embodiment, the chitosan-based polymer includes an oxidized chitosan-based polymer.

In one embodiment, contacting the subterranean formation with the well treatment fluid further includes introducing the well treatment fluid into the wellbore penetrating the subterranean formation. As indicated above, the treatment fluid in the present invention is useful in drilling a well wherein there is circulated in a wellbore (borehole) a drilling fluid during the drilling thereof. The well treatment fluid of this invention is circulated or spotted within a borehole during well drilling or servicing operations. The well treatment fluid can be formulated to provide viscous gels to overcome lost circulation problems in a wellbore.

After careful consideration of the specific and exemplary embodiments of the present invention described herein, a person of ordinary skill in the art will appreciate that certain modifications, substitutions and other changes can be made without substantially deviating from the principles of the present invention. The detailed description is illustrative, the spirit and scope of the invention being limited only by the appended claims.

What is claimed is:

1. A method of treating a subterranean formation penetrated by a wellbore comprising the steps of:
   (a) forming a well treatment fluid comprising:
      (i) water;
      (ii) a chitosan-based polymer; and
      (iii) a oxidized polysaccharide-based polymer, which is able to crosslink with the chitosan-based polymer in water and produce a gel having a viscosity of greater than or equal to about 20 cp, wherein from about 1% to about 25% of the units of the polysaccharide-based polymer are oxidized; and
   (b) contacting the subterranean formation with the well treatment fluid.

2. The well treatment fluid of claim 1 wherein the chitosan-based polymer comprises an oxidized chitosan-based polymer.

3. The well treatment fluid of claim 2 wherein the oxidized chitosan-based polymer is prepared by oxidizing chitosan-based polymers selected from the group consisting of chitosan, chitosan salts, and any combinations in any proportion thereof.

4. The method of claim 3 wherein the chitosan-based polymer is prepared by oxidizing the chitosan-based polymer with an oxidizer selected from the group consisting of sodium hypochlorite, sodium periodate, hydrogen peroxide, peracetie acid, and any mixture in any proportion thereof.

5. The method of claim 4 wherein the oxidized polysaccharide-based polymer is selected from to group consisting of dialdehyde starch, dialdehyde cellulose, oxidized starch, oxidized cellulose, oxidized agarose, oxidized partially-acetylated cellulose, oxidized hydroxyethylcellulose and combinations thereof.

6. The method of claim 5 wherein the oxidized starch, oxidized cellulose, oxidized agarose, oxidized HEC, or oxidized partially-acetylated cellulose is prepared by oxidizing from about 1% to about 25% of the units of the polysaccharide-based polymer with an oxidizer selected from the group consisting of alkali, alkaline earth and transition metal salts of periodate, hypochlorite, perbromate, chlorite, chlorate, hydrogen peroxide and combinations thereof.

7. The method of claim 1 wherein the oxidized polysaccharide-based polymer is selected from the group consisting of dialdehyde starch, dialdehyde cellulose, oxidized starch, oxidized cellulose, oxidized agarose, oxidized partially-acetylated cellulose, oxidized hydroxyethylcellulose and combinations thereof.

8. The method of claim 7 wherein the oxidized starch, oxidized cellulose, oxidized agarose, oxidized hydroxyethylcellulose or oxidized partially-acetylated cellulose is prepared by oxidizing from about 1% to about 25% of the units of the polysaccharide-based polymer with an oxidizer selected from the group consisting of alkali, alkaline earth and transition metal salts of periodate, hypochlorite, perbromate, chlorite, chlorate, hydrogen peroxide and combinations thereof.

9. The method of claim 8 wherein the oxidized polysaccharide is oxidized starch and which is present in an amount of up to about 10 wt%.

10. The method of claim 8 wherein the oxidized chitosan-based polymer is present in the amount of up to about 10 wt% of the water.

11. The method of claim 1 wherein the ration of the oxidized polysaccharide to chitosan-based polymer is in the range of from about 50:1 to about 1:50.

12. The method of claim 1 wherein the viscosity is measured at a pH of about 4 to about 7 and at STP.

13. The method of claim 1 wherein the water for the well treatment fluid is selected from the group consisting of fresh water, seawater, natural brine, formulated brine, 2% KCI solution, and any mixtures in any proportion thereof.

14. The method of claim 1 wherein forming the well treatment fluid further includes the step of crosslinking the chitosan-based polymer with the polysaccharide-based polymer.

15. The method of claim 1 wherein contacting the subterranean formation wit the well treatment fluid further includes introducing the well treatment fluid into a wellbore penetrating the subterranean formation.

16. A method of treating a subterranean formation penetrated by a wellbore comprising the steps of:
   (a) forming a well treatment fluid comprising:
      (i) water;
      (ii) a chitosan-based polymer; and
      (iii) a oxidized polysaccharide-based polymer, which is able to crosslink with the chitosan-based polymer in water and produce a gel having a viscosity of greater than or equal to about 20 cp, wherein the oxidized polysaccharide-based polymer is selected from the group consisting of oxidized starch, oxidized cellulose, oxidized agarose, oxidized hydroxyethylcellulose, oxidized partially-acetylated cellulose and combinations thereof; and
   (b) contacting the subterranean formation with the well treatment fluid.

17. The method of claim 16, wherein from about 1% to about 25% of the units of the oxidized polysaccharide-based polymer are oxidized.

18. The method of claim 16, wherein the oxidized polysaccharide-based polymer is selected front the group consisting of dialdehyde starch, dialdehyde cellulose and combinations thereof.

19. The method of claim 16, wherein the oxidized polysaccharide-based polymer is prepared by oxidizing from about 1% to about 25% of the units of the polysaccharide-based polymer with an oxidizer selected from the group consisting of alkali, alkaline earth and transition metal salts of periodate, hypochlorite, perbromate, chlorite, chlorate, hydrogen peroxide and combinations thereof.

* * * * *